United States Patent [19]

Keasling

[11] 4,030,331

[45] June 21, 1977

[54] KNURLING TOOL

[76] Inventor: David E. Keasling, 1128 McGovock, Tullahoma, Tenn. 37388

[22] Filed: Dec. 27, 1976

[21] Appl. No.: 754,731

[52] U.S. Cl. .................. 72/110; 72/456; 72/703; 29/DIG. 23

[51] Int. Cl.² ........................ B21D 19/06

[58] Field of Search ............ 72/703, 108, 109, 110, 72/125, 455, 456; 29/DIG. 23

[56] References Cited

UNITED STATES PATENTS

| 934,335 | 9/1909 | Nahm et al. | 72/703 |
| 1,414,668 | 5/1922 | Reed | 72/703 |
| 1,492,814 | 5/1924 | Sheberashenko | 72/703 |
| 2,475,216 | 7/1949 | Barker | 72/703 |
| 2,610,304 | 9/1952 | Garner et al. | 72/108 |
| 3,336,776 | 8/1967 | Zerlaut | 72/14 |

Primary Examiner—Michael J. Keenan
Attorney, Agent, or Firm—C. A. Phillips

[57] ABSTRACT

A knurling tool having three knurling wheels adapted to be positioned about a workpiece to be knurled and in which one of these knurling wheels is mounted on a movable block which is adjustably positionable against the workpiece. A quick release mechanism is included which will release the workpiece without affecting the relative working position of the knurling rollers.

4 Claims, 2 Drawing Figures

KNURLING TOOL

BACKGROUND OF THE INVENTION

1. Field of the Invention

This invention relates to tools for applying a knurled surface to round objects, such as tool handles, the knurling being applied to provide a better grip.

2. General Description of the Prior Art

Knurling of tool handles and other objects has been practiced for over a hundred years. U.S. Pat. No. 980,197 illustrates a knurling device employing three knurling wheels relatively orientable at 120° positions about a shaft to be knurled. One of the wheels is mounted on a movable carriage so that this wheel can be moved with respect to the other two to enable a workpiece to be inserted and to adjust knurling force. A problem with this type is that in order to move the tool to knurl at a different position on a workpiece or to insert a new workpiece, the device has to be re-adjusted to set it at an appropriate setting to accommodate the workpiece being knurled. Thus, for example, even though identical diameter workpieces are to be knurled, a tool has to be adjusted for each workpiece, and, in fact, re-adjusted any time that any relative axial movement of the workpiece and tool is to be made, e.g., to effect knurling of a new region on a workpiece.

It is the object of this invention to eliminate the problem of re-adjustment to return the tool to a desired setting which has been once made.

SUMMARY OF THE INVENTION

In accordance with this invention, two knurling wheels are fixed mounted at one end of an elongated slot in a knurling tool frame or housing. A third knurling wheel is mounted on a first block which is adapted to slide in this slot and position this third knurling wheel relative to the other wheels, and thereby effect adjustment of the knurling wheels with respect to a workpiece positioned between them. A second sliding block is positioned in the slot, and it has a threaded passageway through it running longitudinally with respect to the slot, and threaded into this passageway is an adjusting screw which adjustably extends against the first block. By means of a control member, lateral movement of the second block in a direction away from the first block may be prevented, and then, by movement of the adjusting screw, the first block may be adjustably moved to adjust the knurling force applied to the workpiece. This control member is in the form of a movable latch which selectively connects between the second block and a rigid portion of the frmae. Thus, assuming that this control member is in a latched or locked position, the adjustment screw may be operated to effect a desired adjustment of a third knurling wheel for a particular depth of knurling on a particular workpiece. Thereafter, the control member and knurling wheels can be unlocked and locked at will from and to the same adjusted position and without having to re-adjust the adjustment screw.

DETAILED DESCRIPTION OF THE DRAWINGS

Figure 2:
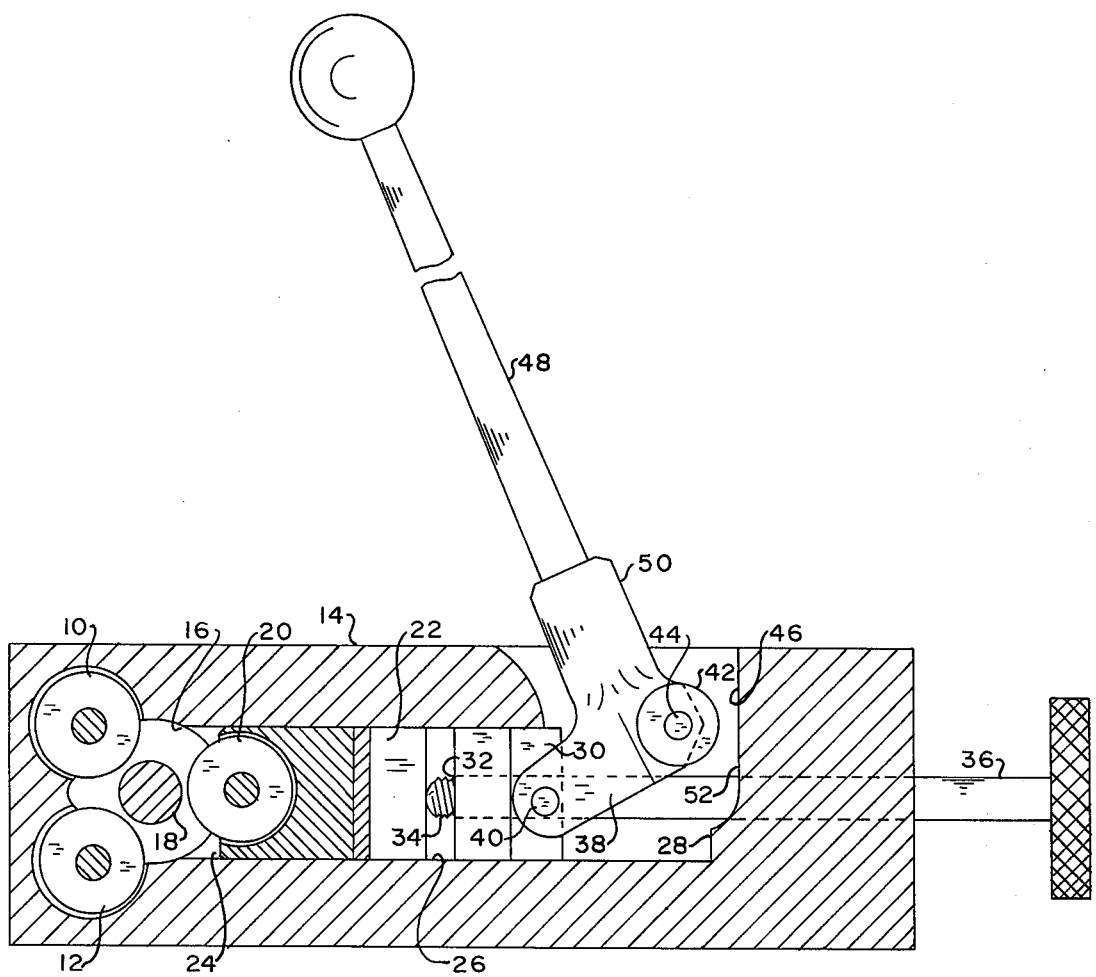
FIG. 2 is a sectional view as seen along lines 2-2 of FIG. 1.
Figure 1:
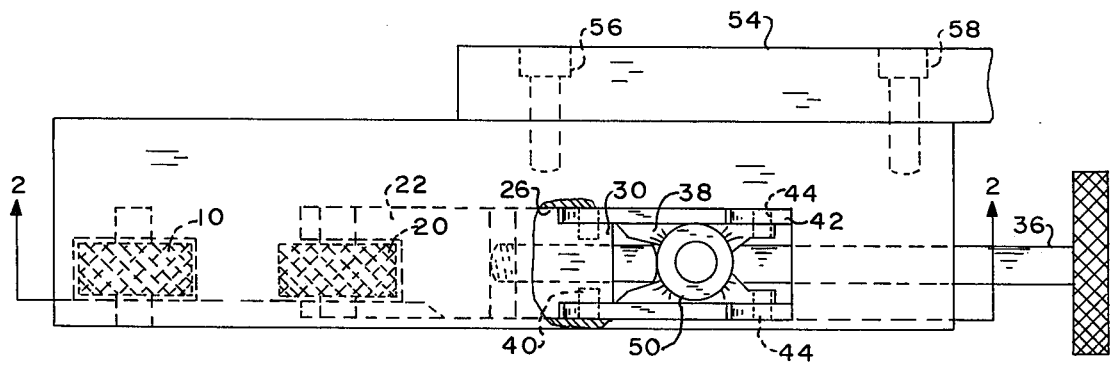
FIG. 1 is a plan view of a knurling device as contemplated by the present invention.

Referring to the drawings, a pair of knurling wheels 10 and 12 are mounted in spaced relation on frame 14 about an opening 16 through which a workpiece 18 would be fed and positioned to be engaged by the knurling wheels. A third knurling wheel 20 is supported by sliding block 22 positioned in a first end region 24 of slot 26 in frame 14. Slot 26 extends longitudinally to thrust backup block 28 which is either rigidly attached to frame 14 or forms a part of frame 14 so that thrust exerted against it is met by the frame.

Adjustment block 30 is slidably positioned between block 22 and block 28 in slot 26 and has a threaded opening 32 for receiving a threaded portion 34 of adjustment screw 36 which functions to set the depth of knurl. As will be observed, this is accomplished by an adjustable extension of screw 36 to the left from block 30 and thereby moving block 22 and knurling wheel 20 further against workpiece 18. In order to accomplish this force, block 30 is lockable against movement to the right by a cam 38. Cam 38 has a split lower body which is generally adapted to straddle adjustment screw 36, being provided at one end by pins 40, which extends through block 30. A pair of rollers 42, supported by pin 44, form an opposite end of cam 38 and are adapted to ride on supporting surface 46 of block 28 to facilitate movement of cam 38 between a locked and unlocked state. An operating level 48 is attached to an upper end region 50 of cam 38, extending generally in a direction normal to a line between pins 40 and 44. Lever 48 is shown tilted to the left (counterclockwise) to effect an unlocked state for cam 38. Cam 38 effects a locking mode when lever 48 is moved clockwise to a vertical position, causing rollers 42 to move downward and to engage lower face region 52 of surface 46 of block 28.

Tool post 54, for rigidly supporting the knurling device when in use, is typically bolted to frame 14 by bolts 56 and 58, in turn typically supported by a carriage which would move the device along the workpiece.

OPERATION

To use the knurling device, lever 48 would be moved to the left to effect an unlocking of cam 38 which will allow roller 20 to be adjusted a discrete distance to the right, enabling a workpiece 18 to be inserted. The workpiece will then be chucked in a lathe and initially, with adjustment screw 36 in a loosen state, lever 48 would be moved clockwise to effect the locking of cam 38, thus making the movement of cam 22 and roller 20 dependent upon the adjustment of screw 36. Screw 36 would then be adjusted, tightening it until desired depht of knurling penetration is set. The workpiece will then be rotated by the lathe, and by the combined action of knurling wheels 10, 12, and 20, a knurling effect would be achieved on workpiece 18 for a desired length as determined by the setting of the length of travel of a conventional carriage attached to the lathe and supporting the knurling device. At the end of a knurling operation on one workpiece, the workpiece would be released by moving lever 48 counterclockwise, releasing the knurling wheels from the workpiece, and enabling that workpiece to be removed and replaced with another one. The carriage and knurling tool would then be moved back to a desired starting position, and with the new workpiece in place, lever 48 would be moved clockwise to again lock the knurling rollers in place. No adjustment of the rollers need be made after a first adjustment, enabling rapid repetitive production of knurled parts. This is in contrast to the previous situation wherein the set-up procedure for knurling parts required an adjustment of the knuring rollers for each part.

Having thus described my invention, what is claimed is:

1. A knurling tool comprising:
    a frame having an opening from one side to an opposite side through which a workpiece to be knurled may be extended, and having an elongated slot in said frame extending normal to and connecting with said opening;
    a first moveable block positionable in and along said slot adjacent to said opening;
    at least three knurling wheels journalled to rotate on parallel axes about said opening and about a workpiece, all said wheels being supported by said frame with at least one of said knurling wheels being mounted on said first block, in turn supported by said frame;
    a second movable block positionable in and along said slot adjacent to said first block, and said second block having a threaded opening extending longitudinally through it in the direction of said slot;
    an adjustment screw threaded through said threaded opening in said second block and adapted to adjustably separate said first and second blocks; and
    locking means for selectively locking and unlocking said second block against travel in said slot in a direction away from said first block, whereby after once having longitudinally adjusted said screw with said locking means in a locked position to effect a desired relative position of said first and second blocks, and thereby between said knurling wheels, said locking means may be locked and unlocked to freely relatively move said knurling wheels with respect to a workpiece without affecting the adjustment.

2. A knurling device as set forth in claim 1 wherein said locking means comprises a cam pivotally mounted to one of said frame and said second block, and having a cam surface contoured to engage between said second block and said frame when in a locked position, and lever means attached to said cam for pivotally moving said cam into and out of a second locked position.

3. A knurling device as set forth in claim 2 wherein said locking means includes an operating handle extending from said cam in a direction generally normal to said slot when said locking means is in a locked position.

4. A knurling device as set forth in claim 3 wherein said cam is pivotally mounted to said second block.

* * * * *